(12) United States Patent
Ito et al.

(10) Patent No.: US 10,444,728 B2
(45) Date of Patent: Oct. 15, 2019

(54) NUMERICAL CONTROLLER PERFORMING POSITIONING FOR AVOIDING INTERFERENCE WITH WORKPIECE

(71) Applicant: FANUC CORPORATION, Minamitsuru-gun, Yamanashi (JP)

(72) Inventors: Motohiko Ito, Yamanashi (JP); Hiroshi Minami, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 246 days.

(21) Appl. No.: 15/292,533

(22) Filed: Oct. 13, 2016

(65) Prior Publication Data
US 2017/0108847 A1 Apr. 20, 2017

(30) Foreign Application Priority Data
Oct. 14, 2015 (JP) .................. 2015-202712

(51) Int. Cl.
*G05B 19/402* (2006.01)
*G05B 19/29* (2006.01)
*G05B 19/4061* (2006.01)

(52) U.S. Cl.
CPC ........... *G05B 19/402* (2013.01); *G05B 19/29* (2013.01); *G05B 19/4061* (2013.01); *G05B 2219/50049* (2013.01)

(58) Field of Classification Search
CPC .. G05B 19/29; G05B 19/402; G05B 19/4061; G05B 2219/50049
See application file for complete search history.

(56) References Cited

U.S. PATENT DOCUMENTS

| 5,872,894 | A | 2/1999 | Watanabe et al. |
| 7,755,316 | B2* | 7/2010 | Ozawa ................. B23Q 39/024 318/560 |
| 2003/0009260 | A1* | 1/2003 | Tanaka ................... B25J 9/1651 700/245 |
| 2007/0186735 | A1 | 8/2007 | Shibui et al. |
| 2009/0145273 | A1 | 6/2009 | Bressler et al. |

(Continued)

FOREIGN PATENT DOCUMENTS

| CN | 101482741 A | 7/2009 |
| CN | 100546741 C | 10/2009 |

(Continued)

OTHER PUBLICATIONS

Notification of Reasons for Refusal for Japanese Application No. 2015-202712, dated Oct. 31, 2017, including English translation, 7 pages.

(Continued)

*Primary Examiner* — Kenneth M Lo
*Assistant Examiner* — Michael J Huntley
(74) *Attorney, Agent, or Firm* — RatnerPrestia

(57) ABSTRACT

A numerical controller controls a machine tool that has a plurality of axes based on a program command. The numerical controller analyzes the program command. When the program command contains a positioning command, the numerical controller generates a correction path bent in a direction going away from the workpiece with respect to a straight-line path toward a commanded position from a current position of the tool that machines the workpiece, and controls respective axes of the machine tool based on the generated correction path.

3 Claims, 8 Drawing Sheets

DELAY MOVE START OF X AXIS SUCH THAT X AXIS FINISHES MOVING AT THE SAME TIME AS Z AXIS

(56) References Cited

U.S. PATENT DOCUMENTS

| | | | |
|---|---|---|---|
| 2010/0087948 A1 | 4/2010 | Yamaguchi | |
| 2015/0012125 A1 | 1/2015 | Haga | |
| 2015/0068272 A1* | 3/2015 | Kasahara | G05B 19/4061 |
| | | | 73/1.79 |
| 2015/0120036 A1 | 4/2015 | Yahaba et al. | |
| 2015/0352679 A1* | 12/2015 | Yamamoto | G05B 19/4061 |
| | | | 73/865.8 |
| 2016/0291572 A1* | 10/2016 | Kato | G05B 11/01 |

FOREIGN PATENT DOCUMENTS

| | | |
|---|---|---|
| CN | 104570929 A | 4/2015 |
| EP | 080139 A1 | 10/1997 |
| JP | 04317104 A | 11/1992 |
| JP | H 08-76827 A | 3/1996 |
| JP | 09044225 A | 2/1997 |
| JP | 2001216012 A | 8/2001 |
| JP | 2008071015 A | 3/2008 |
| JP | 2009282829 A | 12/2009 |
| JP | 2010039995 A | 2/2010 |
| JP | 2010092161 A | 4/2010 |
| JP | 2012058976 A | 3/2012 |
| JP | 2015011669 A | 1/2015 |

OTHER PUBLICATIONS

Chinese Office Action for Chinese Application No. 201610899760. X, dated Feb. 2, 2019 with translation, 26 pages.

* cited by examiner

DELAY MOVE START OF X AXIS SUCH THAT X AXIS FINISHES MOVING AT
THE SAME TIME AS Z AXIS

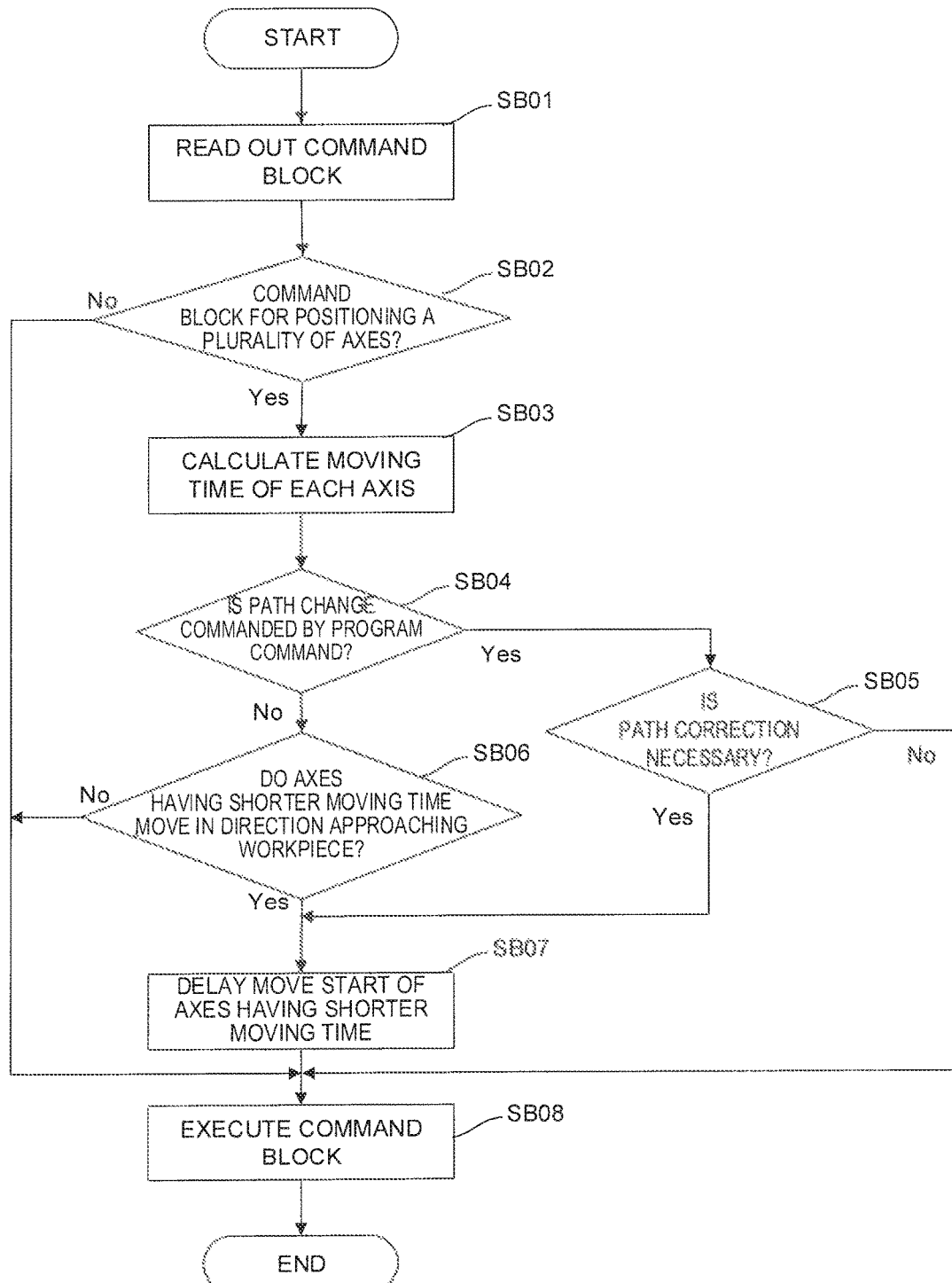

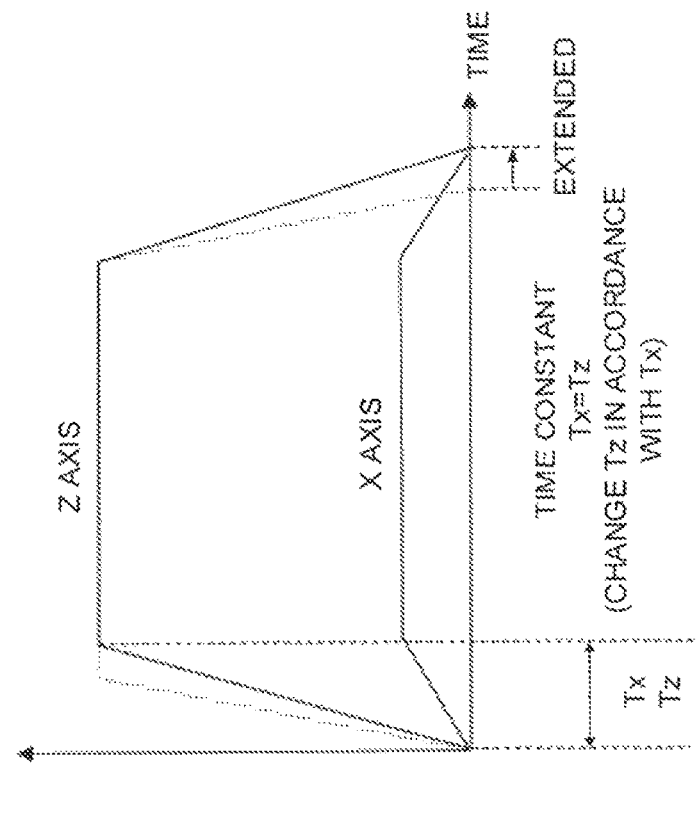
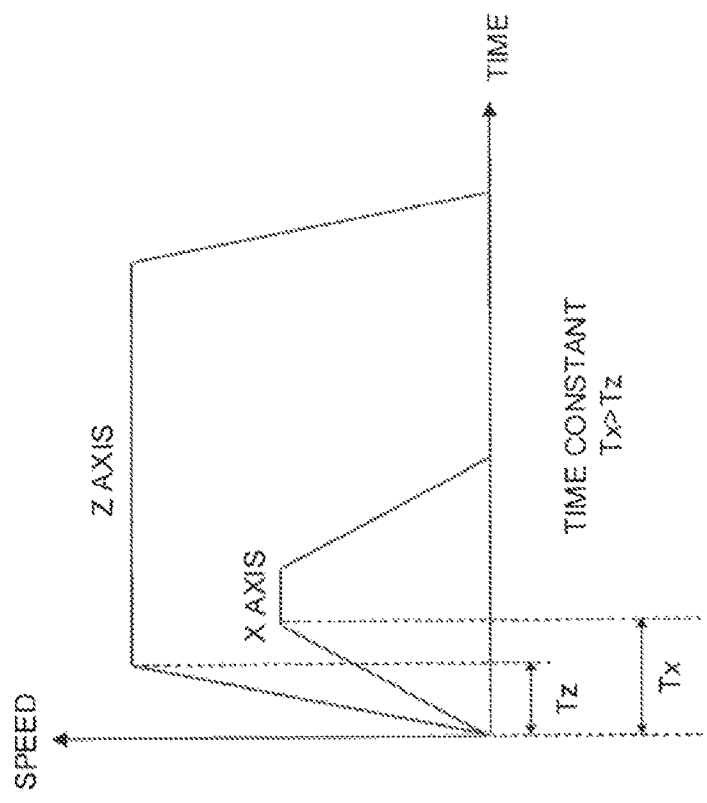

NUMERICAL CONTROLLER PERFORMING POSITIONING FOR AVOIDING INTERFERENCE WITH WORKPIECE

BACKGROUND OF THE INVENTION

1. Field of the Invention

The present invention relates to a numerical controller and, in particular, to a numerical controller that has a function of preventing interference between a tool and a workpiece in a positioning command for moving a plurality of axes simultaneously.

2. Description of the Related Art

In a positioning command for moving a plurality of axes simultaneously, if respective axes do not move in synchronization as in a cutting command, a moving path does not become a straight line. With this, a tool and a workpiece may interfere with each other. An example of a tool and a workpiece interfering with each other will be described below with reference to FIG. 9.

In FIG. 9, in a case where, with a tool 2 positioned on a point A (current position), a command that is for positioning the tool 2 on a point B (commanded position) is executed, and the tool 2 is controlled to move in a straight line, the tool 2 moves along a path illustrated with a solid arrow in FIG. 9. With this, the tool 2 and a workpiece 3 do not interfere with each other. However, in an actual case, synchronization of an X axis and a Z axis is not assured in a positioning command, and the X axis and the Z axis are driven simultaneously at respective speed thereof. In consequence, the tool 2 travels on a moving path illustrated with a dotted arrow in FIG. 9, and the tool 2 and the workpiece 3 interfere with each other. To prevent such a problem from occurring, a prior art technique has used linear interpolation positioning, which performs positioning along a path connecting a start point and an end point with a straight line, with a technique disclosed in Japanese Patent Application Laid-Open No. 08-076827, for example.

However, in order to move a plurality of axes along a path connecting a start point and an end point with a straight line with a technique disclosed in Japanese Patent Application Laid-Open No. 08-076827, for example, linear interpolation positioning has to be used, and fixed-time acceleration and deceleration also has to be used, in which all interpolated axes have the same acceleration speed (time constant).

FIGS. 10A and 10B are diagrams for comparing speed change in axes between a case where tool positioning control is performed with non-linear interpolation positioning (FIG. 10A) and a case where tool positioning control is performed with linear interpolation positioning (FIG. 10B).

As illustrated in FIG. 10A, in a case where positioning control is performed with non-linear interpolation positioning, an X axis and a Z axis are accelerated and decelerated based on time constants set for each axis (Tx for the X axis and Tz for the Z axis) and driven independently. By contrast, as illustrated in FIG. 10B, in a case where tool positioning control is performed with linear interpolation positioning with fixed-time acceleration and deceleration, the time constant Tz for the Z axis is matched with the time constant Tx for the X axis for acceleration and deceleration, and the X axis and the Z axis are driven in synchronization while control is performed so that a commanded speed (maximum speed) is not exceeded.

As described above, with linear interpolation positioning, the largest time constant among those of the interpolated axes has to be set to all the axes to be interpolated, and control has to be performed so that the speed of each axis does not exceed the commanded speed. For these reasons, compared with the case of using non-linear interpolation positioning, there is a problem that the cycle time tends to be longer.

SUMMARY OF THE INVENTION

The object of the present invention is to provide a numerical controller that has a function of preventing interference between a tool and a workpiece while keeping a cycle time short, in a positioning command for moving a plurality of axes simultaneously.

The present invention provides a numerical controller with which, in a positioning command for moving a plurality of axes simultaneously, when a path connecting a start point and an end point with a straight line does not interfere with a workpiece, even if a straight-line path is not selected, interference with the workpiece can be avoided, and positioning enabling a shorter cycle time can be performed.

A numerical controller according to the present invention drives a plurality of axes to relatively move a tool and a workpiece and thus controls, based on a program command, a machine that performs machining on the workpiece. A first aspect of the numerical controller includes a command analysis unit that analyzes the program command to generate move command data and a path correction unit that, when a command from the program command is a positioning command, generates a correction path bent in a direction going away from the workpiece with respect to a straight-line path toward a commanded position commanded by the move command data from a current position of the tool. The numerical controller controls the axes based on the correction path.

The path correction unit may be configured to calculate a moving time for each of, among the axes, a plurality of axes that are moved based on the move command data and generate the correction path by delaying a move start timing of an axis other than an axis having the longest moving time such that when the axis other than the axis having the longest moving time moves in a direction causing the tool to approach the workpiece, the axis other than the axis having the longest moving time finishes moving at the same time as the axis having the longest moving time.

Furthermore, the path correction unit may be configured to determine whether the axis other than the axis having the longest moving time moves in a direction causing the tool to approach the workpiece based on information related to a relation between moving directions of the axes set for respective axes in advance and the workpiece.

A second aspect of the numerical controller according to the present invention includes a command analysis unit that analyzes the program command to generate move command data and a path correction unit that, when a command from the program command is a positioning command containing a bypass command capable of specifying a direction causing a path of the tool to be bent in a direction going away from the workpiece, generates a correction path bent in a direction specified by the bypass command with respect to a straight-line path toward a commanded position commanded by the move command data from a current position of the tool. The numerical controller controls the axes based on the correction path.

According to the present invention, interference of a tool with a workpiece can be avoided by using non-linear interpolation positioning. As a result, a shortest time constant can be set for each axis, whereby a cycle time can be shortened.

BRIEF DESCRIPTION OF THE DRAWINGS

The forgoing and other objects and feature of the invention will be apparent from the following description of preferred embodiments of the invention with reference to the accompanying drawings, in which:

FIG. 8 is a flowchart illustrating a flow of processing performed on a numerical controller according to the second embodiment of the present invention;

FIGS. 10A and 10B are diagrams for comparing speed change in axes between non-linear interpolation positioning and linear interpolation positioning.

DETAILED DESCRIPTION OF THE PREFERRED EMBODIMENTS

According to the present invention, non-linear interpolation positioning is used to move each axis independently, and when an axis having a shorter moving time among the axes commanded moves in "the direction approaching a workpiece", a move start timing of the axis having a shorter moving time is delayed, whereby positioning is performed along a path that expands (is bent) in the opposite direction of the workpiece, along which interference of a tool with the workpiece does not occur.

Figure 1A:
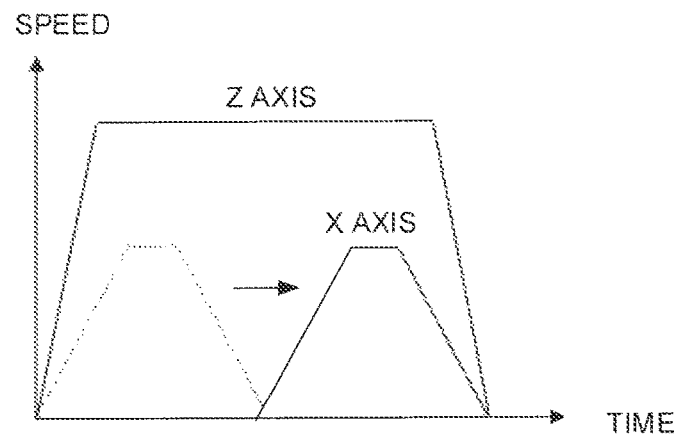
FIGS. 1A and 1B are diagrams for explaining path change for avoiding interference between a tool and a workpiece according to the present invention.
Figure 1B:
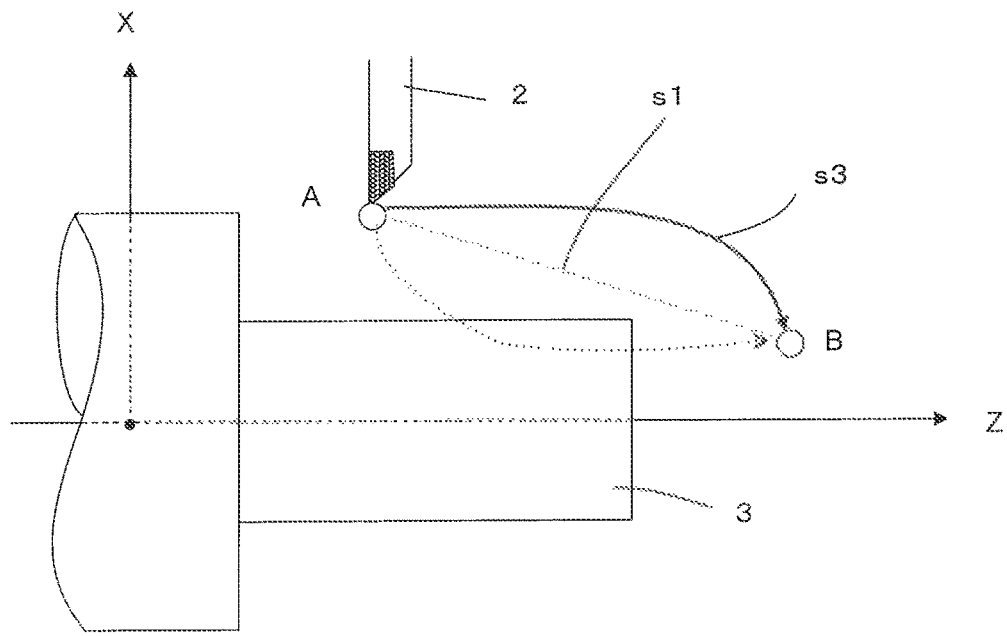

FIGS. 1A and 1B are diagrams for explaining path change for avoiding interference between a tool and a workpiece according to the present invention.

In the example in FIG. 1A, a move start of an X axis having a shorter moving time is delayed such that the X axis finishes moving at the same time as a Z axis having a longer moving time. With this, as illustrated in FIG. 1B, a moving path of a tool 2 is changed to a path s3 along which interference of a tool with a workpiece 3 does not occur.

According to the present invention, when a direction of the workpiece can be automatically specified from a tool edge direction, a rotation center axis direction of the workpiece on a lathe, or CAD data of the workpiece imported into the numerical controller, an automatic determination is made as to whether path change is performed in a normal positioning command. By contrast, when a direction of the workpiece cannot be automatically specified, path change is commanded by a program. For example, between the right side and the left side, in the traveling direction, of a path connecting a start point and an end point with a straight line, a desired moving direction is specified, and a possible moving direction is determined in a case where non-linear interpolation positioning is performed. When the move has been made in the opposite direction to that specified by the program, path change is applied.

Firstly, a first embodiment of the numerical controller according to the present invention will be described with reference to FIGS. 2 to 5.

In this embodiment, path change is performed on a lathe based on an automatic determination, whereby interference between a tool and a workpiece is avoided.

Figure 2:
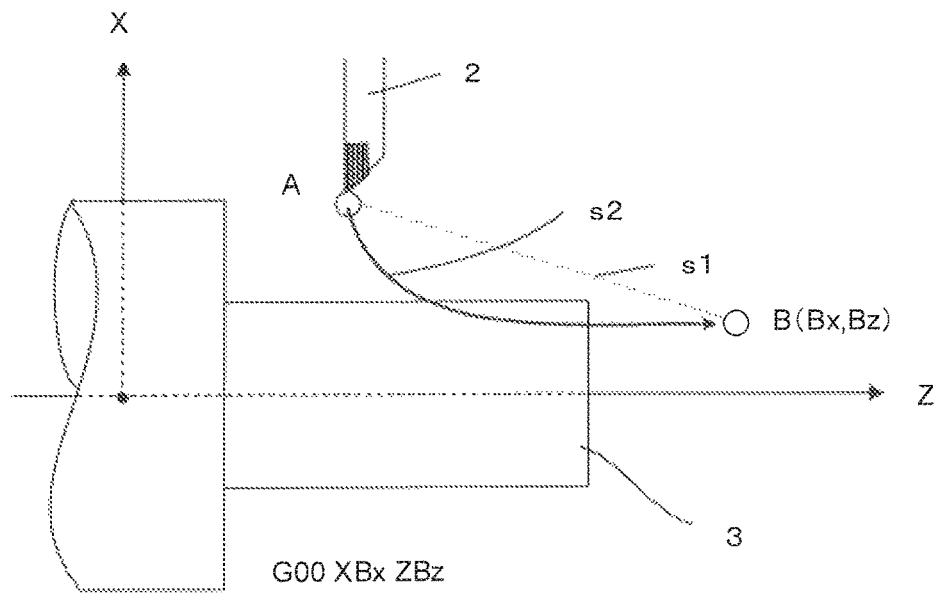
FIG. 2 is a diagram illustrating a tool path in non-linear interpolation positioning in turning.

FIG. 2 illustrates a path in non-linear interpolation positioning in turning.

In FIG. 2, even in a case where a straight line s1 connecting a point A and a point B does not contact the workpiece 3, when a positioning command from the point A to the point B (G00 $XB_x$ $ZB_z$) is executed by non-linear interpolation positioning, both of the X axis and the Z axis start to move simultaneously. With this, the tool path becomes a bent path.

At this point, if the path of the tool 2 is bent in a direction of X=0 separating from the straight line s1 connecting the point A and the point B (in FIG. 2, an area below the straight line connecting the point A and the point B) (path illustrated with a solid line s2), there is a possibility that the tool 2 contacts the workpiece 3. For this reason, the path of the tool 2 (see path s3 in FIG. 1) is changed so as to be bent in the direction opposite to the workpiece 3 (in FIG. 2, an area above the straight line s1 connecting the point A and the point B) so that the tool 2 does not contact the workpiece 3.

Figure 3A:
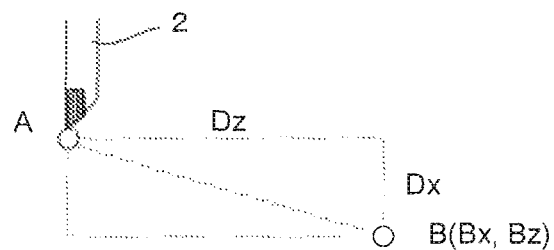
FIGS. 3A to 3C are diagrams for explaining a path in non-linear interpolation positioning in turning according to a first embodiment of the present invention.
Figure 3B:
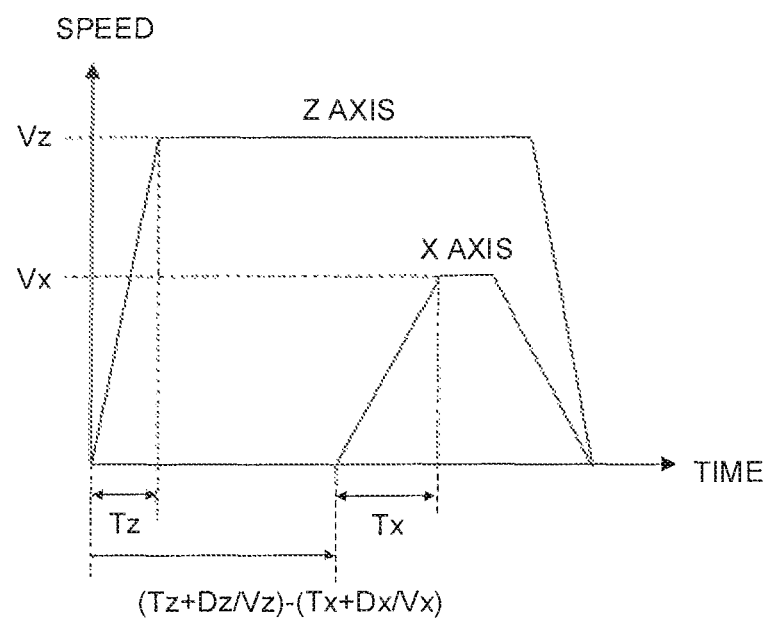
Figure 3C:
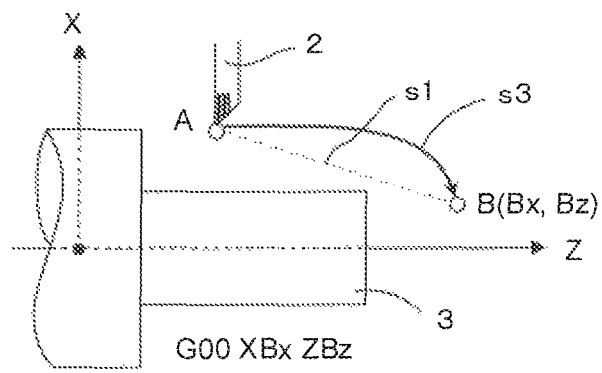

FIGS. 3A to 3C are diagrams for explaining a path in non-linear interpolation positioning in turning according to the present embodiment.

In turning, time constants for the X axis and the Z axis are set to $T_x$ and $T_z$ respectively, rapid traverse speeds of the X axis and the Z axis are set to $V_x$ and $V_z$ respectively, and as illustrated in FIG. 3A, moving amounts of the X axis and the Z axis are set to $D_x$ and $D_z$ respectively. With this, as illustrated in FIG. 3B, the moving time of the X axis is $T_x+D_x/V_x$ and the moving time of the Z axis is $T_z+D_z/V_z$. At this point, in a case where the axis having the shorter moving time moves in "the direction approaching the workpiece", if the X axis and the Z axis start moving simultaneously, the axes may contact the workpiece. For this reason, the move start of the axis having the shorter moving time is delayed by the difference between the moving times of the axes, whereby the X axis and the Z axis finish moving simultaneously. With this, as illustrated in FIG. 3C, the path s3 of the tool 2 become a path bent in "the direction going away from the workpiece 3".

The above-described calculation formulas and the drawings are examples in a case where linear acceleration and deceleration is used. However, also in a case where other acceleration and deceleration methods are used, such as bell-shaped acceleration and deceleration, calculation may be performed using a similar concept.

"The direction approaching the workpiece" in the case of the coordinate system as illustrated in FIG. 3C is the direction toward X=0 (direction toward the center axis of the workpiece) for the X axis, and the minus direction of Z for the Z axis. "The direction approaching the workpiece" may be configured to be able to be set in a setting region provided in a memory of the numerical controller in advance in accordance with the machine to be controlled.

Figure 4:
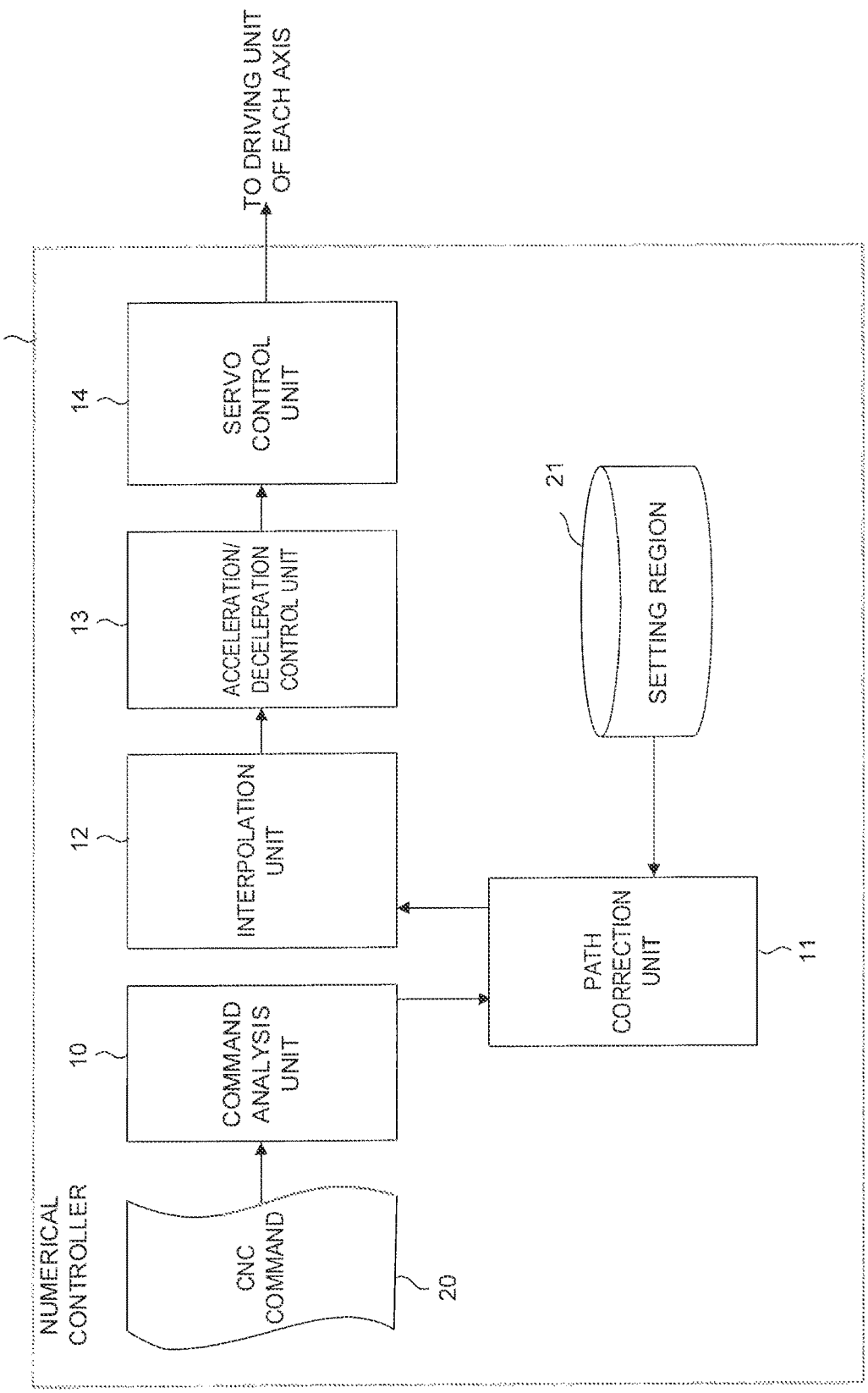
FIG. 4 is a functional block diagram of a numerical controller according to the first embodiment of the present invention.

FIG. 4 is a functional block diagram of a numerical controller according to the present embodiment that performs the above-described operation.

A numerical controller 1 includes a command analysis unit 10, a path correction unit 11, an interpolation unit 12, an acceleration/deceleration control unit 13, and a servo control unit 14.

The command analysis unit 10 sequentially reads out a CNC command 20 from a program stored in a memory (not illustrated), for example, and analyzes the read CNC command 20. The command analysis unit 10 then creates move command data commanding a move of each axis based on a result of the analysis and outputs the created move command data to the path correction unit 11.

When the move command data received from the command analysis unit 10 is for commanding non-linear interpolation positioning of the tool, the path correction unit 11 calculates moving times of each axis based on the move command data and determines whether the moving direction of the axis having the shorter moving time is "the direction approaching the workpiece", as described above. The path correction unit 11 then perform correction of the move command data such that when it is determined that the moving direction of the axis having the shorter moving time is "the direction approaching the workpiece", the move start timing of the axis having the shorter moving time is delayed so that the axis finishes moving at the same time as the other axis. The path correction unit 11 then outputs the corrected move command data to the interpolation unit 12.

By contrast, in a case where a command based on the move command data received from the command analysis unit 10 is not a command for commanding non-linear interpolation positioning of the tool or a case where the command is for commanding non-linear interpolation position but the moving direction of the axis having the shorter moving time is not the direction approaching the workpiece, the path correction unit 11 outputs the move command data received from the command analysis unit 10 directly to the interpolation unit 12.

When it is determined whether the moving direction of the axis having the shorter moving time is "the direction approaching the workpiece" or not, information related to "the direction approaching the workpiece" set for each axis in a setting region 21 is referred to.

The interpolation unit 12 creates data by performing interpolation calculation of points on a commanded path that has been performed in interpolation cycle, based on a move command commanded by the move command data output by the path correction unit 11.

The acceleration/deceleration control unit 13 performs acceleration and deceleration processing based on the interpolation data output by the interpolation unit 12, calculates the speed of each drive axis for each interpolation cycle, and outputs data resulting therefrom to the servo control unit 14.

Thereafter, the servo control unit 14 controls the driving unit of each axis of the machine to be controlled based on the output from the acceleration/deceleration control unit 13.

Figure 5:
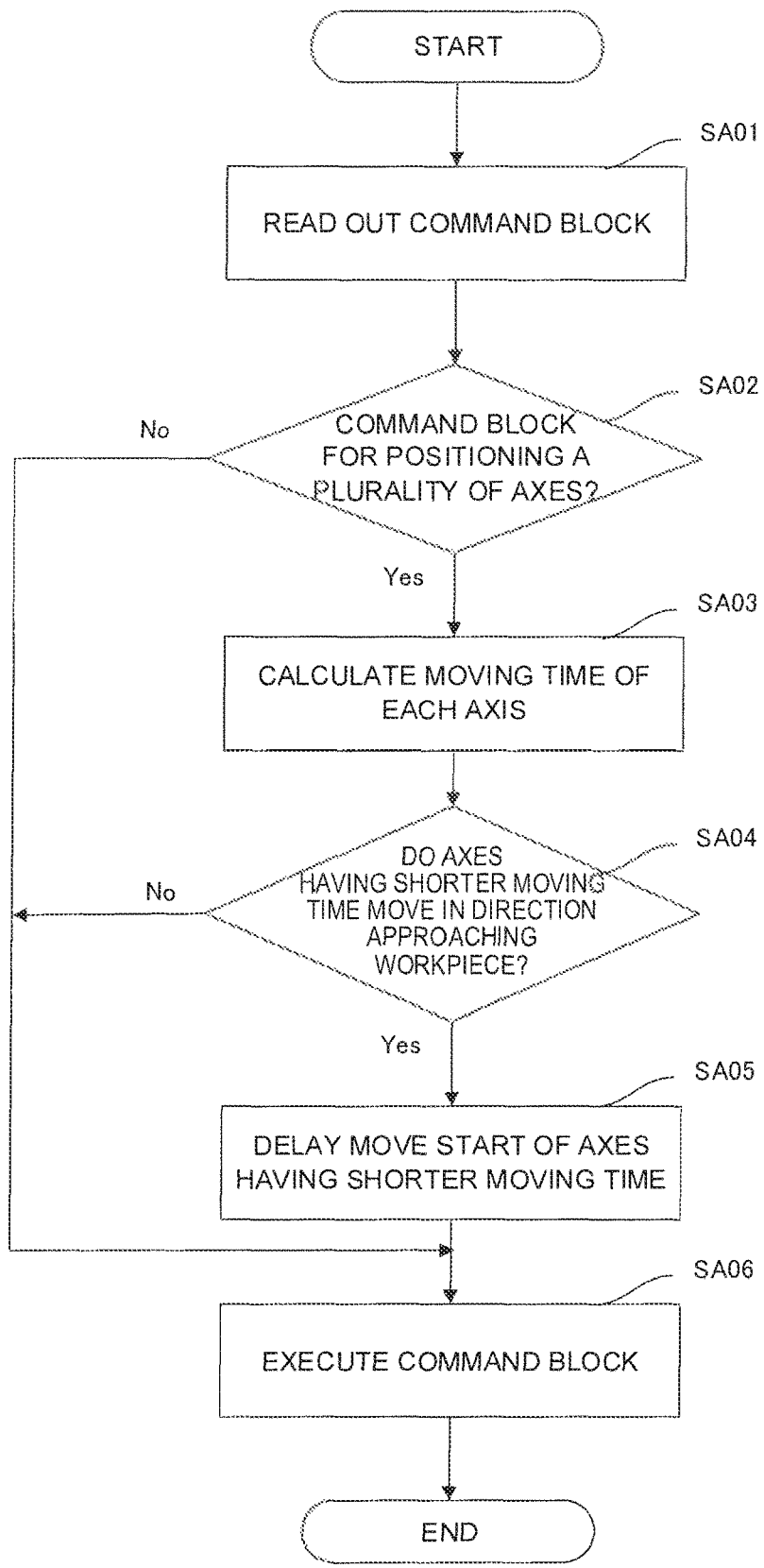
FIG. 5 is a flowchart illustrating a flow of path correction processing in non-linear interpolation positioning performed on the numerical controller illustrated in FIG. 4.

FIG. 5 is a flowchart illustrating a flow of path correction processing in non-linear interpolation positioning performed on the numerical controller illustrated in FIG. 4. The processing is explained below according to respective steps.

[Step SA01] When an operation of a machining program is started, the command analysis unit 10 sequentially reads out command blocks from the machining program containing a plurality of blocks into a memory for calculation of the numerical controller 1 to create move command data.

[Step SA02] The path correction unit 11 determines whether each of the command blocks read out at step SA01 is a block for commanding non-linear interpolation positioning that drives a plurality of axes. When the command block is a block for commanding non-linear interpolation positioning that drives a plurality of axes, the procedure proceeds to step SA03. When the command block is not a block for commanding non-linear interpolation positioning that drives a plurality of axes, the procedure proceeds to step SA06.

[Step SA03] The path correction unit 11 calculates the moving time of each axis to be driven by the command for non-linear interpolation positioning that drives a plurality of axes.

[Step SA04] The path correction unit 11 specifies an axis other than the axis having the longest moving time among the axes driven by the command for non-linear interpolation positioning, based on the moving time calculated at step SA03, and determines whether the specified axis moves in the direction approaching the workpiece. When the axis moves in the direction approaching the workpiece, the procedure proceeds to step SA05. When the axis does not move in the direction approaching the workpiece, the procedure proceeds to step SA06.

[Step SA05] The path correction unit 11 corrects the move command data so as to delay the move start timing of the axis other than the axis having the longest moving time such that the axis other than the axis having the longest moving time finishes moving at the same time as the axis having the longest moving time.

[Step SA06] The command block is executed based on the move command data output from the path correction unit 11.

In the flowchart in FIG. 5, the procedures at step SA01 and step SA06 are the same procedures as in a prior art technique, and the procedures at step SA02 to step SA05 are procedures introduced in the present invention.

As described above, when non-linear interpolation positioning is commanded in the numerical controller 1 according to the present embodiment, as illustrated by the path s3 in FIGS. 1B and 3C, correction is made in a manner such that the moving path of the tool is bent in the direction going away from the workpiece, whereby interference between the tool and the workpiece can be avoided. Furthermore, at that time, the correction is made with the shortest time constant kept set for each axis, whereby the cycle time can be shortened.

Next, a second embodiment of the numerical controller according to the present invention will be described with reference to FIGS. 6 to 8.

In the present embodiment, change of the path is executed by a program command at a machining center, whereby interference between the tool and the workpiece is avoided.

Figure 6:
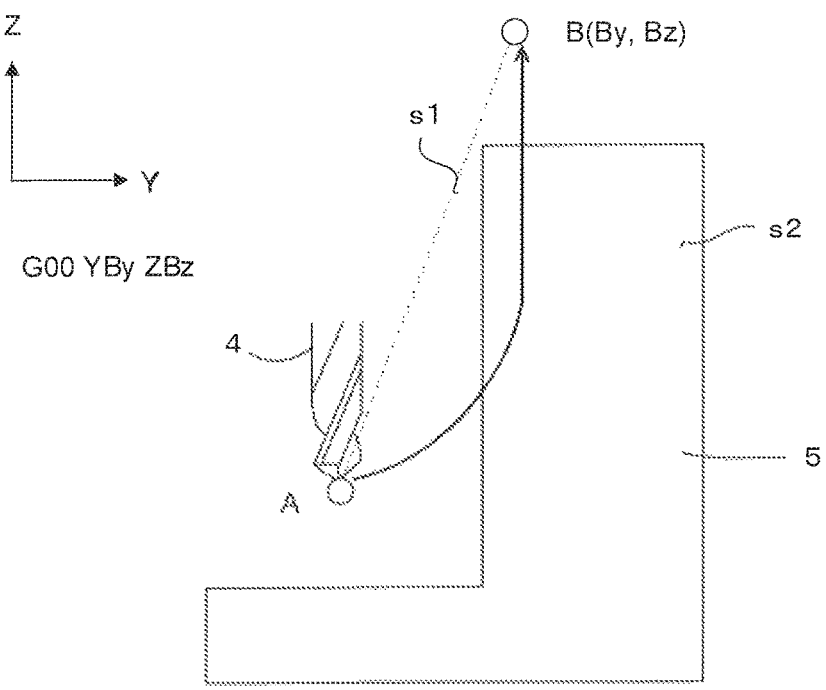
FIG. 6 is a diagram illustrating a path in non-linear interpolation positioning in machining at a machining center.

FIG. 6 illustrates a path in non-linear interpolation positioning in machining at a machining center.

In FIG. 6, when a tool 4 is positioned at the point A, a command for positioning the tool 4 to the point B (G00 $YB_y$, $ZB_z$) is executed in a case where non-linear interpolation positioning is selected for positioning control, both the Y axis and the Z axis start to move simultaneously, whereby the path s2 of the tool becomes a path bent in a manner approaching the workpiece 5.

In such a case also, change of the path is performed as in the first embodiment to avoid interference between the tool and the workpiece. Furthermore, in a case where three or more axes are moved simultaneously also, as in the first embodiment, with respect to axes having moving times shorter than that of the axis having the longest moving time and moving in the direction approaching the workpiece, the move starts thereof are delayed. The axes are controlled to finish moving at the same time as the axis having the longest moving time, whereby interference between the tool and the workpiece can be avoided.

There is also a case where the direction approaching the workpiece cannot be simply determined, such as the case of an inner space surrounded by walls. In order to be able to correspond to such a situation, in the present embodiment, a bypass command is introduced into a machining program to specify the direction in which the moving path of the tool is bent, and based on the program command thereof, the direction in which the moving path is bent can be specified.

As an example, with respect to the traveling direction of a path connecting a start point and an end point on a YZ plane, a G code of a bypass command in a case where the left side is specified is set to G101, and that of a bypass command in a case where the right side is specified is set to G102. In the example illustrated in FIG. 6, when non-linear interpolation positioning is performed, for the tool 4 not to interfere with the workpiece 5, the tool 4 has to be bent so that it passes on the left side of the path connecting a start point (point A) and an end point (point B) with the straight line s1, in the direction of advance, as viewed from the front of the drawing.

Figure 7:
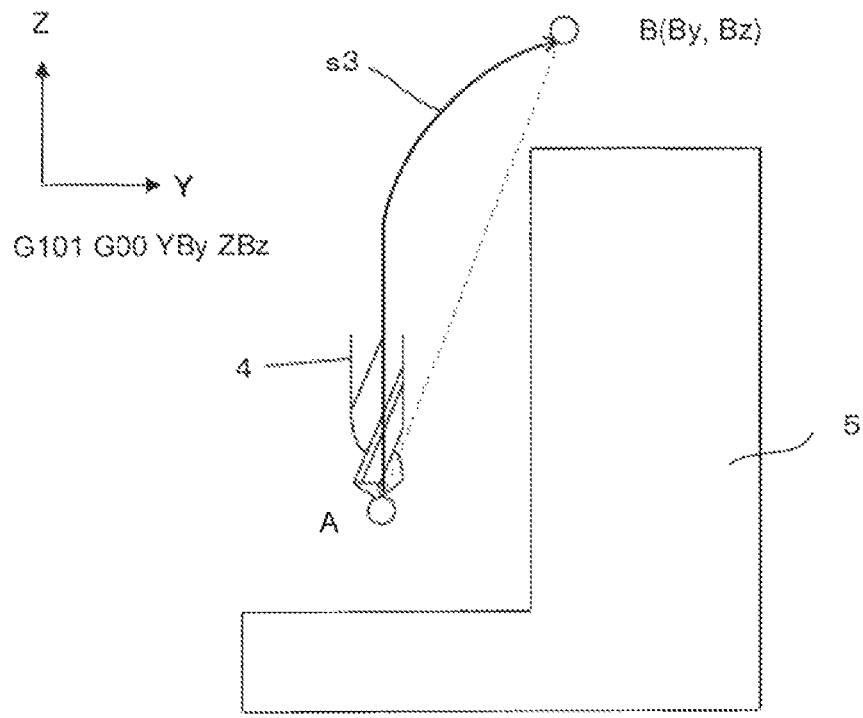
FIG. 7 is a diagram for explaining a correction path in non-linear interpolation positioning using a bypass command according to a second embodiment of the present invention.
Figure 9:
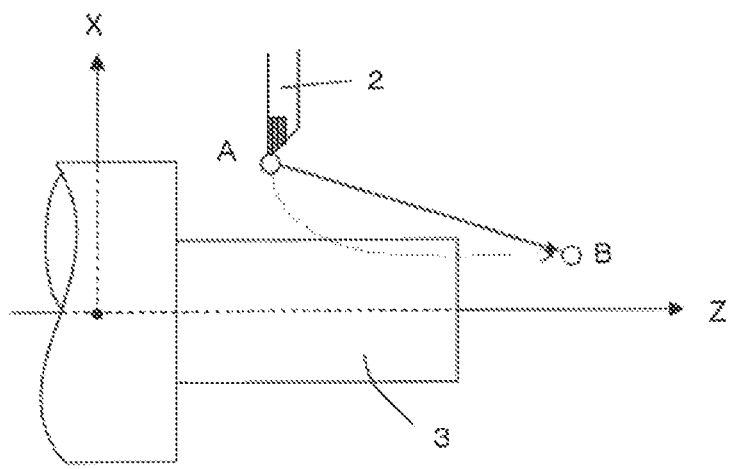
FIG. 9 is a diagram illustrating an example of interference between a tool and a workpiece in positioning of the tool.

In view of the above, as illustrated in FIG. 7, G101 is contained in a block of positioning command. As a result, the path is bent in a direction opposite to the direction (the right side) in the case of non-linear interpolation positioning. For this reason, change of the path is applied and the moving times of both of the axes are calculated, whereby the move start of the Y axis having the shorter moving time is delayed. Accordingly, the path s3 of the tool 4 becomes a path that is bent so as to go away from the workpiece 5. As described above, for a part for which it cannot be automatically determined whether the path is bent in the direction approaching the workpiece or in the direction going away from the workpiece, the direction in which interference can be avoided is specified by the program.

A functional block diagram of the numerical controller according to the present embodiment that performs the above-described operation is the same as the functional block diagram of the numerical controller according to the first embodiment (FIG. 4). However, in the numerical controller 1 according to the present embodiment, the path correction unit 11 thereof is different from that in the first embodiment in that the path correction unit 11 performs path correction described above based on a bypass command.

FIG. 8 is a flowchart illustrating a flow of path correction processing for non-linear interpolation positioning performed on the numerical controller according to the present embodiment. The processing is explained below according to respective steps.

[Step SB01] When an operation of a machining program is started, the command analysis unit 10 sequentially reads out command blocks from the machining program containing a plurality of blocks into a memory for calculation of the numerical controller 1 to create move command data.

[Step SB02] The path correction unit 11 determines whether each of the command blocks read out at step SB01 is a block for commanding non-linear interpolation positioning that drives a plurality of axes. When the command block is a block for commanding non-linear interpolation positioning that drives a plurality of axes, the procedure proceeds to step SB03. When the command block is not a block for commanding non-linear interpolation positioning that drives a plurality of axes, the procedure proceeds to step SB08.

[Step SB03] The path correction unit 11 calculates the moving time of each axis driven by the command for non-linear interpolation positioning that drives a plurality of axes.

[Step SB04] The path correction unit 11 determines whether the command block read out at step SB01 contains a bypass command for commanding path change. When the command block contains a bypass command, the procedure proceeds to step SB05. When the command block does not contain a bypass command, the procedure proceeds to step SB06.

[Step SB05] The path correction unit 11 determines whether the bending direction commanded by the bypass command is the opposite direction to the direction of non-linear interpolation positioning, that is, whether path correction is necessary or not. When path correction is necessary, the procedure proceeds to step SB07. When path correction is not necessary, the procedure proceeds to step SB08.

[Step SB06] The path correction unit 11 specifies an axis other than the axis having the longest moving time among the axes driven by the command for non-linear interpolation positioning, based on the moving time calculated at step SB03, and determines whether the specified axis moves in the direction approaching the workpiece. When the axis moves in the direction approaching the workpiece, the procedure proceeds to step SB07. When the axis does not move in the direction approaching the workpiece, the procedure proceeds to step SB08.

[Step SB07] The path correction unit 11 corrects the move command data so as to delay the move start timing of the axis other than the axis having the longest moving time such that the axis other than the axis having the longest moving time finishes moving at the same time as the axis having the longest moving time.

[Step SB08] The command block is executed based on the move command data output from the path correction unit 11.

In the flowchart in FIG. 8, the procedures at step SB01 and step SB08 are the same procedures as in a prior art technique, and the procedures at step SB02 to step SB07 are procedures introduced in the present invention.

As described above, when non-linear interpolation positioning is commanded in the numerical controller 1 according to the present embodiment, correction is made in a manner such that the moving path of the tool is bent in the direction going away from the workpiece, whereby interference between the tool and the workpiece can be avoided. Furthermore, because the user can specify the bending direction of the tool path using a bypass command by the machining program, even in a position where the direction going away from the workpiece is hard to determine, interference between the tool and the workpiece can be avoided. As a result, correction is made with the shortest time constant at that time set for each axis, whereby the cycle time can be shortened.

The embodiments according to the present invention have been described. However, the present invention is not limited to the examples in the above-described embodiments, and may be implemented in various forms by adding appropriate modifications.

The invention claimed is:
1. A numerical controller that drives a plurality of axes to relatively move a tool and a workpiece to control a machine that performs machining on the workpiece based on a program command, the numerical controller comprising:
- a command analysis unit that analyzes the program command to generate move command data; and
- a path correction unit that, when a command from the program command is a non-linear positioning command of the tool, generates a correction path bent in a direction going away from the workpiece with respect to a current straight-line path from a start point toward a commanded position commanded by the move command data such that the path correction unit changes the current straight-line path of the tool to the correction path to prevent the tool from contacting the workpiece, wherein the numerical controller controls the axes based on the correction path, and
- wherein the path correction unit is configured to calculate a moving time for each of a plurality of axes that are moved based on the move command data, among the axes, and generate the correction path by delaying a move start timing of an axis other than an axis having the longest moving time such that when the axis other than the axis having the longest moving time moves in a direction causing the tool to approach the workpiece, the axis other than the axis having the longest moving time finishes moving at a same time as the axis having the longest moving time.

2. The numerical controller according to claim 1, wherein the path correction unit is further configured to determine whether the axis other than the axis having the longest moving time moves in a direction causing the tool to approach the workpiece based on information related to a relation between moving directions of the axes set for respective axes in advance and the workpiece.

3. A numerical controller that drives a plurality of axes to relatively move a tool and a workpiece to control a machine that performs machining on the workpiece based on a program command, the numerical controller comprising:
- a command analysis unit that analyzes the program command to generate move command data; and
- a path correction unit that, when a command from the program command is a positioning command containing a bypass command capable of specifying a direction causing a path of the tool to be bent in a direction going away from the workpiece, generates a correction path bent in a direction specified by the bypass command with respect to a straight-line path toward a commanded position commanded by the move command data from a current position of the tool such that the path correction unit changes the straight-line path to the correction path to prevent the tool from moving in a direction towards the workpiece, wherein the numerical controller controls the axes based on the correction path, and
- wherein the path correction unit is configured to calculate a moving time for each of a plurality of axes that are moved based on the move command data, among the axes, and generate the correction path by delaying a move start timing of an axis other than an axis having the longest moving time such that when the axis other than the axis having the longest moving time moves in a direction causing the tool to approach the workpiece, the axis other than the axis having the longest moving time finishes moving at a same time as the axis having the longest moving time.

\* \* \* \* \*